United States Patent [19]

Winders

[11] 4,107,521

[45] Aug. 15, 1978

[54] SOLAR SENSOR AND TRACKER APPARATUS

[76] Inventor: Gordon Robert Winders, 204 Chatterson Dr., Raleigh, N.C. 27609

[21] Appl. No.: 732,463

[22] Filed: Oct. 14, 1976

[51] Int. Cl.² .................................................. G01J 1/20
[52] U.S. Cl. ........................... 250/203 R; 250/214 AL
[58] Field of Search ........... 250/201, 203, 216, 237 R, 250/239, 551, 209, 214 AL; 356/141, 152; 126/270, 271

[56] References Cited

U.S. PATENT DOCUMENTS

| | | | |
|---|---|---|---|
| 2,155,402 | 4/1939 | Clark | 250/203 R |
| 3,421,004 | 1/1969 | Cashion | 250/203 R |
| 3,440,426 | 4/1969 | Bush | 250/203 R |
| 3,524,986 | 8/1970 | Harnden | 250/551 |
| 3,708,672 | 1/1973 | Marinkovic | 250/209 |
| 3,917,942 | 11/1975 | McCay | 126/270 |

*Primary Examiner*—David C. Nelms

[57] ABSTRACT

Improved solar sensor and tracker apparatus is described in which an extremely low cost high angular accuracy sensor and tracking device utilizing a symmetrical sensor shade and sensor arrangement is described. An improved circuit control for electric motor drive of the tracker apparatus is also described in which a relatively high speed track operation followed by a relatively slow speed homing in motion is automatically provided by the control circuit driving the electric motors.

1 Claim, 10 Drawing Figures

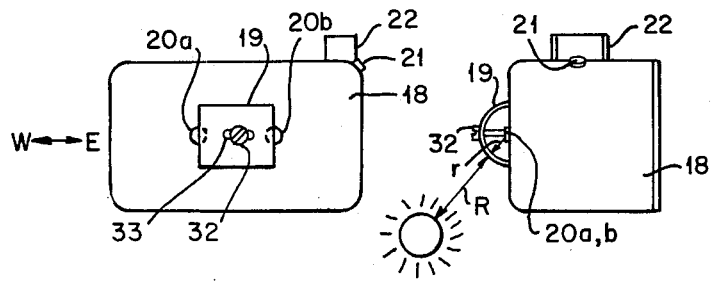
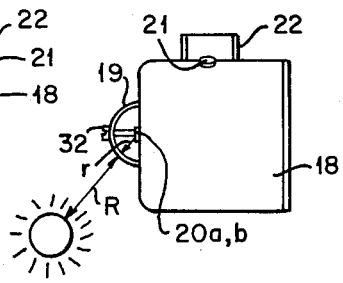
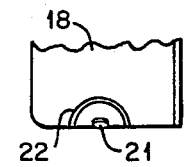
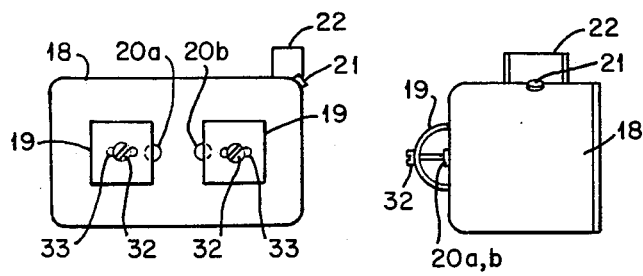
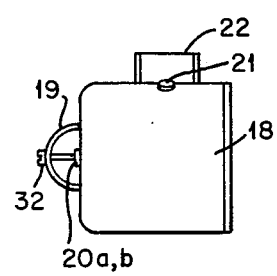
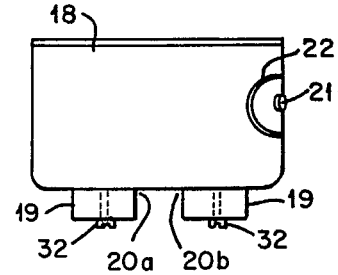
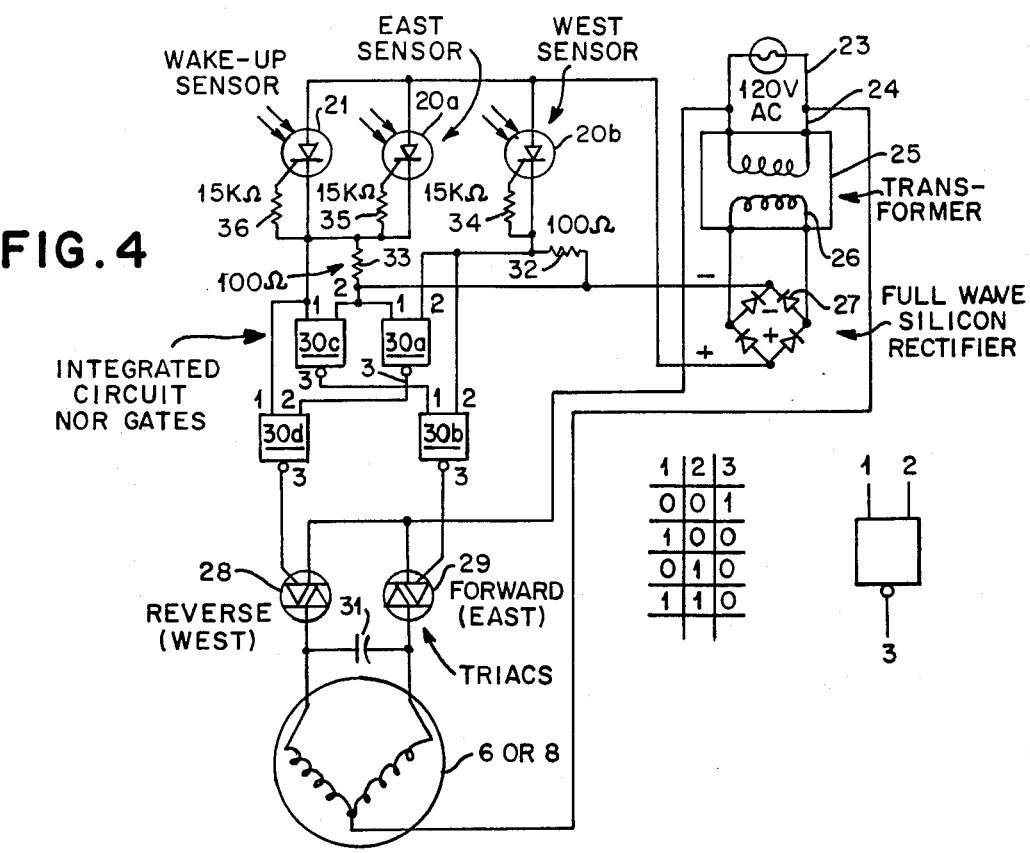

SOLAR SENSOR AND TRACKER APPARATUS

BACKGROUND AND FIELD OF THE INVENTION

This invention relates to solar energy collector apparatus in general and to tracker mechanisms for focused solar energy collectors in particular and to the control circuits therefor.

Prior Art

Many prior art solar tracker devices are in existence and have met with a greater or lesser degree of success. One prior device is exemplified by U.S. Pat. No. 3,028,856 in which the solar tracker utilizes a sun shade to inhibit the light impinging on the light sensor so that the sensor is caused either to be shaded or unshaded by motion of the tracking device and shade. The sensors are arranged so that the overall system will be aimed at the sun whenever the sensors are shaded and will be caused to move when the sensors are unshaded. The motion of the system moves the shadow from the shade device relative to the sensor to effect proper orientation of the device.

U.S. Pat. No. 3,917,942 shows a solar sensor and tracking control in which two sensors are located adjacent to a sun shade and second control means are connected to the sensors to control the motion of the overall device on which the mechanism and circuitry is mounted so that the effective aim of the system is directed toward the sun.

Multi-axis sensor and shade combinations for effective aiming are also known as illustrated by U.S. Pat. No. 2,923,826. Another approach which utilizes maximum illumination of the sensor is illustrated in U.S. Pat. No. 2,969,707.

The foregoing and a good many other prior art patents and devices exist and are well-known in the field. Several problems, however, exist with these and others. Primarily, the complexity of the control system which requires reversing motors or reversing mechanisms are a source of cost, complexity, and inherent inaccuracies. A relay control for electric motors to drive the system back and forth and the sensitivity of the sensors utilized all combine to create a problem with hunting for the source of energy, namely the sun, which is well-known in the field.

It is most desirable with focused collector devices, that very accurate aim be maintained at all times to maximize the energy collected. Hunting in the control circuit and operative motion mechanism is therefore objectionable since it results either in continuous motion about the target point without ever locking onto it, or in a constant error or aiming inaccuracy which reduces the effectiveness of the collector.

Devices such as those described are also unreliable due to the complexity of the system and the stresses inherent in correcting for hunting effects or in continuously searching for the target. These devices are also expensive due to their complexity and the need for precision components which must be shielded from the elements to which they are exposed. One has only to consider the relative expense and complexity of stellar telescopic aiming mechanisms to appreciate the problem involved with accurately aiming and moving a large, fairly heavy solar energy collecting apparatus mounted on gimbals for the purpose.

In light of the obvious shortcomings and deficiencies in the noted prior art above, it is an object of this invention to provide an improved and simplified solar sensor and tracker apparatus of lower cost and higher reliability which avoids the difficulties with hunting known to exist in the prior art.

Still another object of this invention is to provide an improved solar sensor and tracker combination in which a very high degree of angular accuracy in the aiming platform can be attained in a simple and effective manner.

Yet another object of the invention is to provide an improved control circuit and sensor combination for operating electric drive motors which operate the aiming platform means to produce a relatively high speed long distance translation followed by a very slow speed homing in control due to the effects of a particular sensor and drive circuit combination of an improved type.

SUMMARY OF THE INVENTION

In the improved solar sensor and tracker apparatus of the present invention, the foregoing and other objects are met by providing at least one drive motor for each direction of freedom of rotation in the aiming platform and a separate control circuit for each drive motor. The control circuit incorporates a light activated silicon control rectifier which has a very small, light-sensitive active area. The light sensor is positioned relative to a symmetrically formed sun shade so that the active area will be shaded when the structure on which the sensor and shade are mounted is aimed directly at the source of light. Due to the symmetrical arrangement of the sun shade with respect to the sensor, the geometric ratio of the distance between the edge of the sun shade and the sensor is held constant regardless of the angle of incidence at which light strikes the shade. An even response to light from various angles is therefore achieved and a smooth and accurate positioning is obtained. The use of light activated silicon control rectifiers as light sensors which are utilized also to control triac power control transistors produces a unique result. The light activated SCR's are sensitive to voltage changes on the input signal, such as ramp or pulsating voltages, and will produce very short output pulses when they are partially illuminated on the active area, which output pulses can be applied to the triacs to switch them on for very brief periods and provides a very low speed motion control for the electric drive motors.

Having set forth the broad principles of my invention, and the objects to which it is directed, I will now describe a preferred embodiment thereof with reference to several drawings and figures but, as will be apparent to those of skill in the art, many departures from the preferred form made be made without departing from the spirit and scope of the invention.

BRIEF DESCRIPTION OF THE DRAWINGS

FIG. 3 illustrates the sensor mounting and shade arrangement for an azimuth control unit.

FIG. 4 illustrates the circuit diagram of a typical sensor and motor control apparatus to be utilized with the sensor and shade configuration of FIGS. 2 and 3.

FIG. 5 illustrates an alternative sensor mounting and shade configuration for use either as an altitude or azimuth control unit.

DETAILED SPECIFICATION

Figure 1:
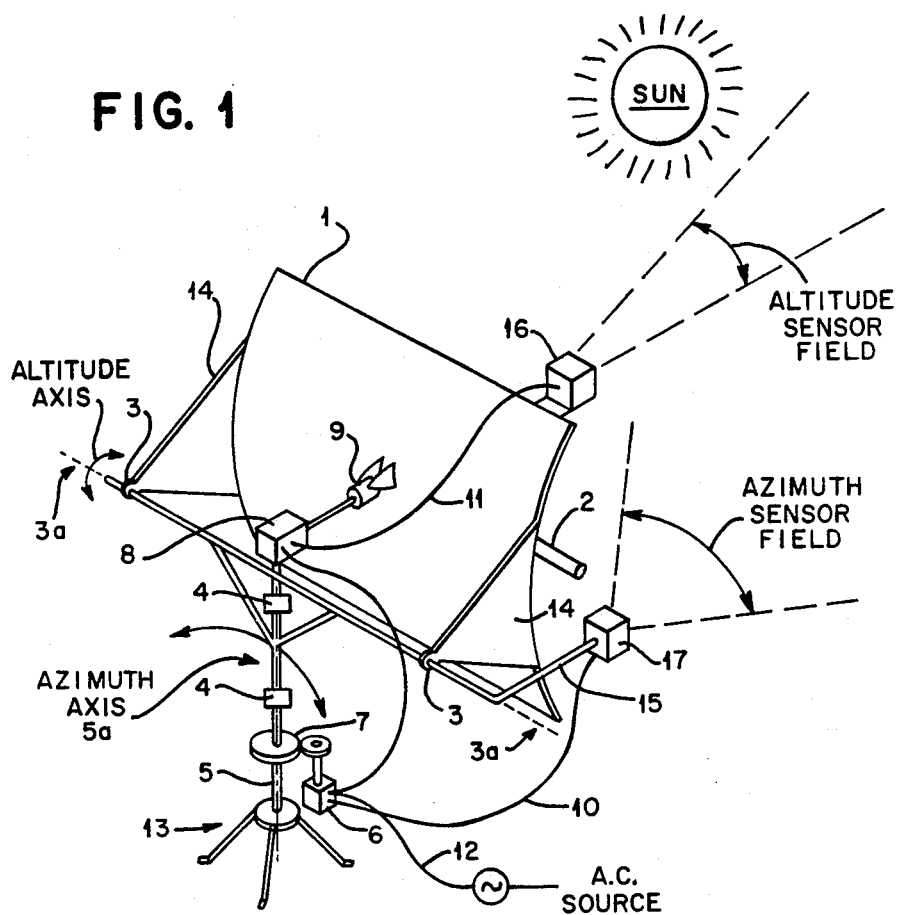
FIG. 1 shows a schematic diagram of a solar tracker system for two axis tracking utilizing a parabolic solar collector, for example.

Turning to FIG. 1, a typical parabolic reflector utilized as a solar energy collector is illustrated in an orientation generally aimed toward the sun. The collector panel 1 is shaped parabolically to focus the sun's energy on the collecting tube 2. The connections to the tube 2 to carry fluid to be heated through the heating zone are not shown but are well-known to those skilled in the art. Bearings 3 and axis 3A are schematically shown for raising or lowering the collector assembly 1 in the altitude direction. Other bearings 4 are schematically shown fixedly mounted to a support structure to allow for azimuthal axial rotation of the entire assembly. Drive gears 7 are operated by motor 6 to provide the azimuth axis 5A drive by rotating shaft 5 which turns in bearings 4. Motor 6 is connected to a source of AC current by connection 12 as is a similar motor 8 connected through a lead screw and follower nut 9 to raise and lower the collector 1 on the altitude axis 3a. Power is also supplied on lines 10 and 11 to the altitude sensor 16 and the azimuth sensor 17, respectively. Rigid end pieces 14 hold the collector 1 faced outwardly from the altitude axis 3a in bearings 3.

It will be appreciated that the azimuth sensor 17 is mounted rigidly to the frame on which 14 turns so that the azimuth sensor can follow the sun but will not be raised and lowered in altitude by motions produced by motor 8 and lead screw and follower nut 9 which are affixed to the altitude axis 3a and to collector 1 as shown to tilt the collector 1 in the altitude direction in response to controls from the altitude sensor 16 fixedly mounted to collector 1 as shown by sensor 16. Frame 15 is schematically shown by straight line pieces 3 and 15, but does not change in altitude so that the sensitivity field of sensor 17 will not be exceeded.

A fixed tripod mount 13 is schematically shown mounting the entire assembly so that free motion about the altitude axis 3a and the azimuth axis 5a, respectively, can be obtained by driving appropriate motor 8 or 6 in the appropriate direction. It will be easily understood that motors 6 and 8 are required to be reversible or to have reversing gear mechanisms attached so that scanning in both directions of rotation can be produced for tracking the sun's course across the sky up and down during the day and then returning to repeat the process the next day.

The overall schematic in FIG. 1 illustrates the basics of a solar tracker system for a focused parabolic collection apparatus. The purpose of illustrating the overall mechanism is to show the orientation of the azimuth and altitude sensosr 17 and 16, respectively, as they are affixed to the collector 1 or to the frame 15 for movement therewith. It will be appreciated that once the sensors 16 and 17 are properly oriented toward the sun, due to their fixed attachment and orientation relative to the surface of the collector 1, that the collector will be properly oriented toward the sun as well. This is the purpose of the present invention.

Figure 2A:
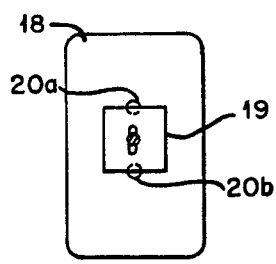
FIG. 2 shows the sun sensor mounting and shade arrangement utilized for an altitude control sensor.

Turning now to FIGS. 2A dnd 2B of the apparatus, the control box 18 for a typical altitude control sensor configuration (which may also be utilized as an aximuth control box) is illustrated. Box 18 serves as a container for the circuitry and electronics which will be described later and it will be understood that an appropriate source of power enters and leaves box 18 for the control of a motor connected thereto as shown in FIG. 1. In FIG. 2A, a top or plan view of the typical control installation is shown in which a fixed shade 19 is mounted on the surface of box 18. Two separate solar sensors, 20a and 20b, which in the preferred embodiment are light activated silicon control rectifiers, (LASCR's) are illustrated as being partially shaded by shade 19. These are sensors 20A and 20B. The electronics contained in box 18 are designed so that when both sensors 20A and 20B are appropriately shaded (or if both are fully illuminated), no driving control output is provided to the motor connected to box 18 and no driving motions are produced. It will be instantly appreciated that if the sun moves relative to the orientation of the sensor shade 19, one of the sensors 20 will become more illuminated (or shaded) than the other and appropriate control signals and output current will be produced by output circuit line (not shown) connected to the appropriate motor to drive it in the correct direction to realign the unit with both photo sensors 20A and 20B again shaded (or illuminated).

Figure 2B:
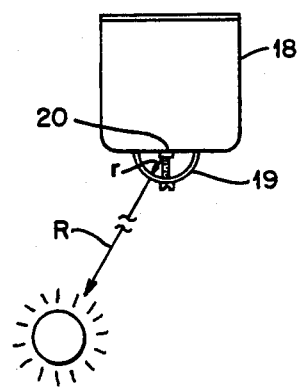

In FIG. 2B, and end view of the same assembly shown in FIG. 2A is illustrated and it will be seen that the sensors 20 protrude slightly from the surface of box 18 and, importantly, shade 19 is semi-circular in form and is positioned symmetrically with respect to sensors 20. It is a specific attribute of the present invention that the shade has an edge at a distance r from the sensors 20, one edge being positioned over each sensor as can be clearly seen in FIG. 2A, so that the edge of the shade 19 is everywhere equidistant from the active region of the sensor 20 which it shades. This is illustrated by the small radial arrow with the small r in FIG. 2B. The sun is illustrated schematically positioned at a distance R along the same radial line. It will be appreciated that the ratio of r to R is approximately 0 due to the great magnitude of R but that, for increasing r, the geometric ratio or leverage effect in the moving shadow produced by relative motion between shade edge 19 and the sun will be greater. For example, given r of ½ inch, approximately a 20 seconds of angular movement of the sun is necessary before the field of shadow moves far enough to uncover enough of the active area of the sensor to trigger it (which is approximately 0.0005 of an inch motion). However, given a r of 1 inch, only about 10 seconds of angular motion is required to produce the same 0.0005 inch motion in the shadow. Thus, it may be seen that with a fixed on/off light band width sensitivity area on the sensor 20, the angular accuracy of the aiming system can be improved by increasing r.

The continuous angular precision of control is provided by the fact that r is constant with the varying field angle which the sun may assume. This may be appreciated by returning to FIG. 2B where it may be seen that, if the sensor 20 is the center of a radius of arc and the sun moves in an arc in the plane of the paper that the ratio of r to R remains fixed whereas this would not be the case with a flat elevated, umbrella type of shade, aperture shade or other similar shade arrangement heretofore utilized in the prior art.

Turning to FIGS. 3A–3C, the typical configuration of a control box 18 utilized for aximuth aiming is illustrated. FIG. 3A illustrates a frontal side view of the unit; FIG. 3B illustrates an end view looking in a western direction; and FIG. 3C illustrates a top or plan view of the apparatus in FIGS. 3A and 3B. A shade 19 is shown positioned above sensors 20A and 20B of the same type as illustrated in FIG. 2A. The shade 19 and the sensors 20A and 20B are arranged in an eastwest alignment as illustrated in FIG. 3A. The axis of the semi-circular shade is 19 colinear in an east-west direction with the sensors. This produces a unit which is sensitive to east and west motions of the sun relative to the collector unit and the sensor mounted on the frame for azimuthal control.

A separate semicircular shade 22 and individual sensor 21 arranged concentrically with the shade 22 are shown in the FIGS. 3A–3C. This sensor operates as a wake-up sensor to return the tracking unit to the east at sunrise to pick up the sun and to track it across the sky during the day. This is necessary as, when the sun sets in the west in the evening, there will be no source of light to track, and the orientation of the unit may be such that the east and west sensors 20A and 20B cannot pick up enough light as early as would be desired to bring the tracking unit back to the east for tracking the sun.

It will be appreciated that box 18 illustrated in FIGS. 3A–3C contains appropriate electronics to be described below for controlling the direction of rotation and power supply to a tracking motor such as motor 6 or 8 illustrated in FIG. 1.

Turning now to FIG. 4, the preferred embodiment of a circuit for controlling the operation of the tracking motors in response to the illumination of sensors 20A, 20B and 21 will be detailed.

As was noted at the outset, it is highly desirable that a tracking control be provided which can achieve a very accurate high-speed tracking to make up for periods when the sun has been occluded by shadow or cloud and which will also home in at a low and accurate rate of speed when the angular misalignment between the sensor and the sun is close to zero so that excursions and hunting will not be produced when one of the sensors is more illuminated than the other and the unit commands a motor to drive in a given direction. In FIG. 4, sensor 21 schematically shows a light activated silicon control rectifier (LASCR) utilized in a typical azimuth control unit as the wake up sensor. Other light activated silicon control rectifiers 20A and 20B are utilized as east and west sensors, respectively, in such a unit. It will be appreciated that for altitude control, a wake up sensor is not utilized and sensors 20A and 20B are oriented vertically as shown in FIG. 2; the control circuit remains the same, however, with the elimination of sensor 21 and bias resistor 36.

Power is supplied from 120 volt AC source 23 to the primary input 24 of a transformer 25 which has a low voltage output secondary 26 connected to a full wave silicon rectifier bridge 27 to supply pulsating full wave rectified power to the control circuitry and to light activated silicon control rectifiers 20A, 20B and 21 and to the logic circuits 30A–30D. The full wave silicon rectifier output constitutes a pulsating DC wave, as will be well understood by those skilled in the art, and this feature is used to advantage as will be detailed below.

The properties of light activated silicon control rectifiers are utilized to advantage in this invention. The first property which is of importance is that the light activated silicon rectifier has a transistor junction which is of extremely small size and therefore provides a very small size light sensitive region. This produces a minimal field of sensitivity for the light beam which impinges on the sensor. This is the area which it is necessary to cover for partial or complete triggering of the sensor. Secondly, these devices are inherently threshold devices which may be adjusted to some degree by varying the bias resistors 34, 35 or 36, respectively. The light activated silicon rectifiers inherently require a relatively high light intensity for triggering (this is on the order of 100 foot candles or more typically). Thus, these devices are insensitive to brief fluctuations of light intensity and, by setting the amount of bias current which will be permitted to pass by the use of bias resistor 34, 35 and 36 as shown, the level of current output from a given sensor which is required for triggering the logic circuitry 30A–30D can be accurately set.

Bias resistors having a value of about 100 ohms are illustrated at 32 and 33 in the negative side of the power supply from the full-wave rectifier 27. These bias resistors, 32 and 33, collapse the positive leakage voltage from the light activated silicon control rectifiers (LASCR) and the trigger lead from the NOR gate to assure a near zero positive voltage at the NOR gate trigger leads (less than 0.4 volts).

Logic circuits 30A30D are integrated circuit NOR gates which have the truth table functions illustrated in the small diagram in the bottom right hand corner of FIG. 4. The result of these is that if both inputs 1 and 2 to a given NOR-gate 30 are near 0 (or negative) potential, the output will be positive, and if one of the inputs is positive or both are positive, the output at point 3 of each said affected gates will be negative.

The operation of the sensors and NOR-gates can now be understood by assuming that the east sensor 20A receives light first from the rising sun in the morning and that west sensor 20B will still be shielded by a shade 19 such as shown in FIGS. 2 or 3. When the light level reaches a sufficient amount to overcome the drain due to bias resistor 35, typically a 15 kilo ohm resistor, the voltage at the input to NOR gate 30C on lead 1 will reach a positive value in excess of 2.5 volts positive. Thus, in accordance with the truth table function shown, this will produce a negative output at 3 of 30C which is applied to the input 1 of gate 30B. The other input of 30B will have a negative level input due to the fact that the west sensor 20B is connected there and the west sensor has not yet been illuminated as much as the east sensor. (It will also be appreciated that if the west sensor 20B does happen to be illuminated, 30B will not produce a positive output and the motor will not be driven.) Therefore, both inputs to NOR gate 30B will be negative and its output will be positive. This output is connected to the triac 29 to supply AC power through the triac, which is supplied with 120 volt AC as shown, in FIG. 4.

Triac 29 is in a circuit with an appropriate reversible AC motor 6 or 8 shown in FIG. 1 and schematically illustrated in FIG. 4. This produces a forward or east drive by applying pulsating DC control inputs to triac 29. The triacs 28 and 29 have the property that, when triggered, even though supplied with a constantly pulsating input, they can effectively provide a pulsating (or chopped) AC output at their output terminals. The light activated silicon control rectifiers have the characteristics of only allowing portions of the pulsating DC input wave to pass as they approach the "on" condition. This partial wave passed by the light activated silicon control rectifier triggers only half of the triac 28 or 29 and this results in about a ¼ speed power output for ¼ speed motor operation of the affected drive motor connected to the triac. As the solar illumination on a given sensor increases, the light activated silicon control rectifier passes several partial waves and the drive motor will move a full portion of a revolution at higher speed since the output wave from the triac will not be chopped as much. This produces a full speed quick tracking action, but also will move the shadow produced by the solar shade on the affected sensor and reduce the level of illumination on the sensor to bring back the partial pulsating DC passage by the affected light activated silicon control rectifier and restore the ¼ speed motor operation due to triggering only half of a given triac connected thereto. Thus, an efficient high speed tracking mechanism which automatically moves into quarter speed homing in tracking operation as a result of the circuit element characteristics, is produced. This operation, in combination with the inhibited function produced by the logic system 30A–D, provides a stable system that will not jitter or hunt.

Assume for example that a 5 degree correction of aim is needed due to interruption of tracking by a passing cloud over the sun. As soon as the appropriate sensor is illuminated, a drive motor will come to full speed, but as the shade casts a shadow on the activated LASCR junction, the motor will drop to one quarter speed and slowly home in to the "off" state and thereafter only small pulses of partial waves will be passed by the LASCR to the particular triac to which it is connected, thus causing quarter speed correction pulses to be applied to the drive motor. It is possible to utilize a shortened one piece shade or adjust the two shade arrangement so that motor desist is caused by illumination of both sensors. Fine shimming is caused by intermittent shading of the eastern sensor. I have operated the unit in both modes.

The integrated circuit NOR gates 30AD provide an inhibit function so that the motor will not be commanded in two directions at one time. Twin NOR gates are cascaded to supply a pulsating or chopped 6 volt DC control to the triacs 28 and 29 to trigger the triacs as a transistor to provide a 120 volt AC relay function to the motor.

The triacs drive a permanent split phase motor in the appropriate direction and phase isolation between the power supply is insured by an isolating capacitor 31 shown connected between the supplies 28 and 29. It will be appreciated that it is not desirable to trigger both triacs simultaneously and that the integrated circuit NOR gates 30A–D provide this function.

Turning now to FIGS. 5A–5C, an alternative sensor mounting and shade arrangement is illustrated. FIG. 5A shows a front side view of a configuration suitable for azimuth or altitude control, but positioned in FIG. 5A for azimuth control. Separate shades 19 are independently adjustable by means of screw 32 in a slot 33 provided in each of the shades. The screw 32 finds matching threads in the cover of box 18. Similar adjustment means are provided for the single shade arrangement in FIGS. 2 and 3 discussed previously but, for simplicity, discussion of this feature was withheld until this time. The ability to adjust the position of shades makes for easy field tuning of the sensor for local conditions and for specific variations in individual sensors 20A, 20B, etc. Shade 22 is fixed in place but may be provided with suitable adjustable means if desired. The western sun shade 22 is included to prevent high summer sun angles from reaching the wake up sensor during the latter period of the day when the unit is aimed toward the west.

It will be appreciated that any number of sensors with appropriate shades can be employed for a given coverage on a given axis of rotation. The three sensor configuration shown in FIGS. 3 and 5 will provide complete coverage for the middle latitudes of the United States, except for a few summer months when the sun angles may be such that the western sensor will not call the unit to extreme western positions from an extreme eastern resting position; such an occurrence would be rare, however, since it is not likely that the unit will be resting in an eastern position and be called late in the day to a western position.

Returning now to FIG. 4, the specific integrated circuit NOR gates utilized were type 7402-quad 2-input positive NOR gates. The LASCR's were Radio Shack 276-1095-1.6 amp and the triacs were GE-SC136D.

Advantages

The invention as shown in the preferred embodiment illustrates an unusually simple concept for jitter free AC motor control in a tracking system and is quite inexpensive to implement due to the ready availability of the sensor devices, logic circuits, and triac controls. Extremely high accuracy can be achieved with a two direction error band of less than 1 degree of arc and a single direction error band of less than 20 seconds of arc. Typical figures are within ten to twenty seconds of arc alignment accuracy without utilizing high tolerance mechanisms for driving or positioning the system or requiring expensive stepping motors or other similar incremental motor drives. The arrangement of the sensors also provides for rain cleaning of them and there are no small slots, objects, or slits which require maintenance or cleaning. The devices utilized are quite temperature stable and will have a long life in the field.

Having thus described my invention with relationship to a preferred embodiment thereof, what is claimed is:

1. In a tracking apparatus for a solar energy collector in which there is provided, for each axis of tracking freedom, a reversible A.C. electric motor operatively connected to drive a pivotably mounted frame supporting the collector for tracking the same about the axis of said pivots, and wherein there is also provided for each said axis of tracking freedom a sensor and a motor control means and sources of electric power for operating said motor and control means, an improvement in the tracking sensor and motor control apparatus, comprising:

a source of pulsating D.C. electric power connected to each said sensor;

said sensors being light activated silicon control rectifiers;

inhibitory logic means for blocking the simultaneous passage of outputs from any two said sensors for opposite directions of control motor rotation, said logic means being connected to the outputs of said sensors which are used for controlling a given motor rotation for tracking said collector in a given plane and about a given axis, and said logic means also being connected to said source of pulsating D.C. power at only one of two outputs of said logic means at any one time in response to the illumination of said sensors connected thereto, thereby supplying pulsating D.C. power to control the operation of said motor in only one direction at any one time;

two triac A.C. power switching means connected to a source of A.C. electric power at the switched inputs thereof and, at the outputs thereof, to the inputs of said reversible A.C. motor for said given plane and axis of tracking, for said collector, the control inputs of said triacs being connected to the pulsating D.C. outputs of said inhibitory logic means so that both of said triacs may not be simultaneously switched on by the control outputs from said logic means, to provide a chopped A.C. power to said motor, and a phase reversing capacitance connected across the outputs of said triacs and the inputs of said motor, in parallel, to insure the proper direction of rotation of said motor in response to A.C. power supplied by one or the other of said triacs.

* * * * *